US009194701B2

(12) United States Patent
Bösch

(10) Patent No.: US 9,194,701 B2
(45) Date of Patent: Nov. 24, 2015

(54) DISTANCE-MEASURING DEVICE ALIGNMENT

(71) Applicant: LEICA GEOSYSTEMS AG, Heerbrugg (CH)

(72) Inventor: Thomas Bösch, Lustenau (AT)

( * ) Notice: Subject to any disclaimer, the term of this patent is extended or adjusted under 35 U.S.C. 154(b) by 0 days.

(21) Appl. No.: 14/367,205

(22) PCT Filed: Dec. 11, 2012

(86) PCT No.: PCT/EP2012/075125
§ 371 (c)(1),
(2) Date: Jun. 19, 2014

(87) PCT Pub. No.: WO2013/092318
PCT Pub. Date: Jun. 27, 2013

(65) Prior Publication Data
US 2014/0347650 A1   Nov. 27, 2014

(30) Foreign Application Priority Data

Dec. 23, 2011   (EP) .................................... 11195515

(51) Int. Cl.
*G01C 3/08*   (2006.01)
*G01S 17/08*   (2006.01)
(Continued)

(52) U.S. Cl.
CPC .. *G01C 3/08* (2013.01); *G01C 3/12* (2013.01); *G01S 7/481* (2013.01); *G01S 7/4812* (2013.01); *G01S 7/497* (2013.01); *G01S 7/4972* (2013.01); *G01S 17/08* (2013.01)

(58) Field of Classification Search
CPC ......... G01S 17/10; G01S 17/00; G01S 7/497; G01S 7/48

USPC ............ 356/3.01–3.15, 4.01–4.1, 5.01–5.15, 356/6–22, 28, 28.5
See application file for complete search history.

(56) References Cited

U.S. PATENT DOCUMENTS

| 6,781,675 | B2* | 8/2004 | Gogolla et al. .............. 356/4.01 |
| 7,142,288 | B2 | 11/2006 | Stierle et al. | |
| 7,684,058 | B2* | 3/2010 | Sprenger ....................... 356/614 |
| 2008/0231828 | A1 | 9/2008 | Skultety Betz et al. | |
| 2010/0165320 | A1 | 7/2010 | Wolf et al. | |

FOREIGN PATENT DOCUMENTS

| DE | 4002356 C1 | 2/1991 |
| DE | 10157378 A1 | 6/2003 |

(Continued)

OTHER PUBLICATIONS

European Search Report dated May 23, 2012 as received in Application No. Ep 11 19 5515.

*Primary Examiner* — Luke Ratcliffe
(74) *Attorney, Agent, or Firm* — Maschoff Brennan

(57) ABSTRACT

Some embodiments of the invention relates to an alignment method and an optoelectronic distance-measuring device. The optoelectronic distance-measuring device may comprise an assembly having a radiation source for emitting an optical transmission radiation, a detector for receiving an optical reception radiation and a printed circuit board, which are arranged in a rigid local relationship with respect to one another, and also an optical unit carrier with a transmission optical unit and a reception optical unit. In some embodiments, a transmission direction is defined by the radiation source and the transmission optical unit and a reception direction is defined by the detector and the reception optical unit. Furthermore, the transmission optical unit and the reception optical unit may have different focal lengths.

20 Claims, 7 Drawing Sheets

(51) Int. Cl.
  *G01S 7/481* (2006.01)
  *G01S 7/497* (2006.01)
  *G01C 3/12* (2006.01)

(56) References Cited

FOREIGN PATENT DOCUMENTS

| | | | |
|---|---|---|---|
| EP | 0738899 | A1 | 10/1996 |
| EP | 0932835 | A1 | 8/1999 |
| EP | 1311873 | A0 | 5/2003 |
| EP | 1 351 070 | A1 | 10/2003 |
| EP | 1 752 788 | A1 | 2/2007 |
| EP | 1 980 878 | A1 | 10/2008 |
| EP | 2 051 102 | A1 | 4/2009 |
| EP | 2589980 | A1 | 5/2013 |
| WO | 02/16964 | A1 | 2/2002 |
| WO | 03/046604 | A2 | 6/2003 |
| WO | 2007/012531 | A1 | 2/2007 |
| WO | 2007/033860 | A1 | 3/2007 |
| WO | 2011/076907 | A1 | 6/2011 |

\* cited by examiner

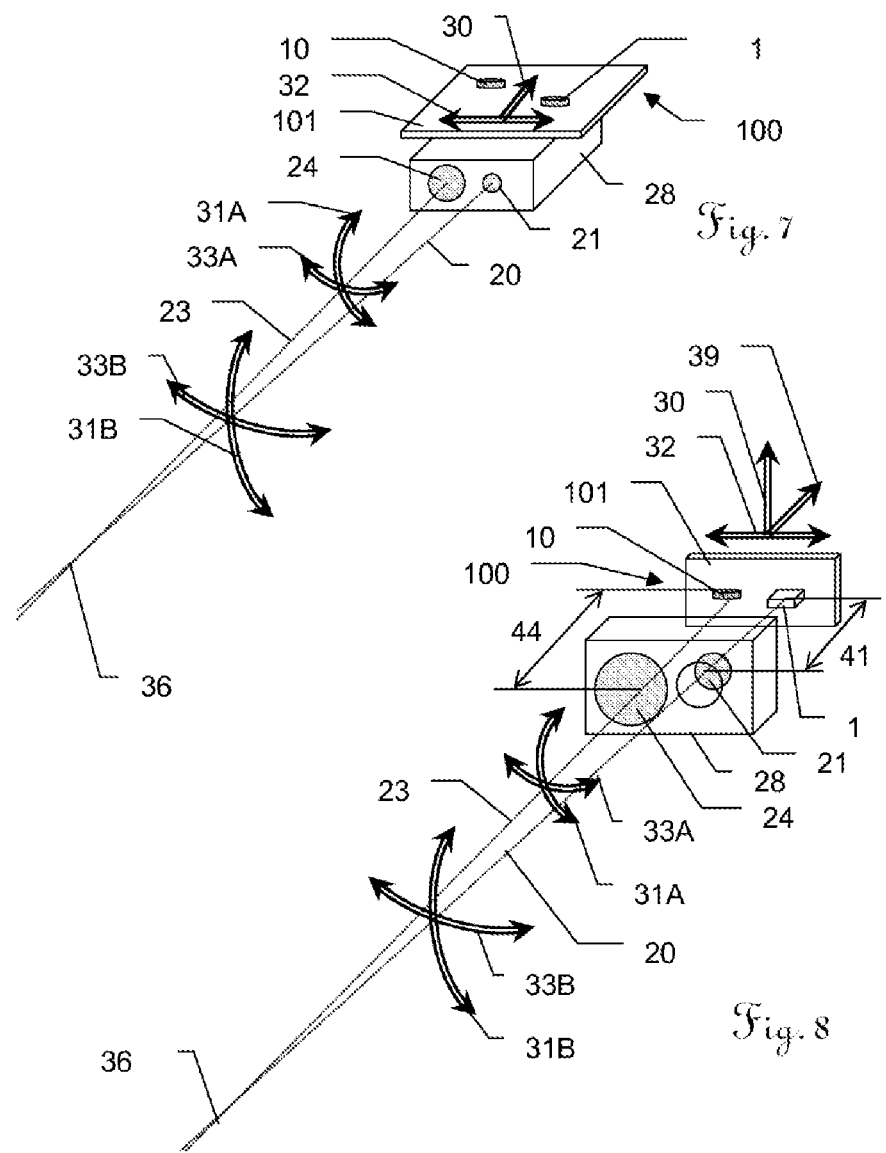

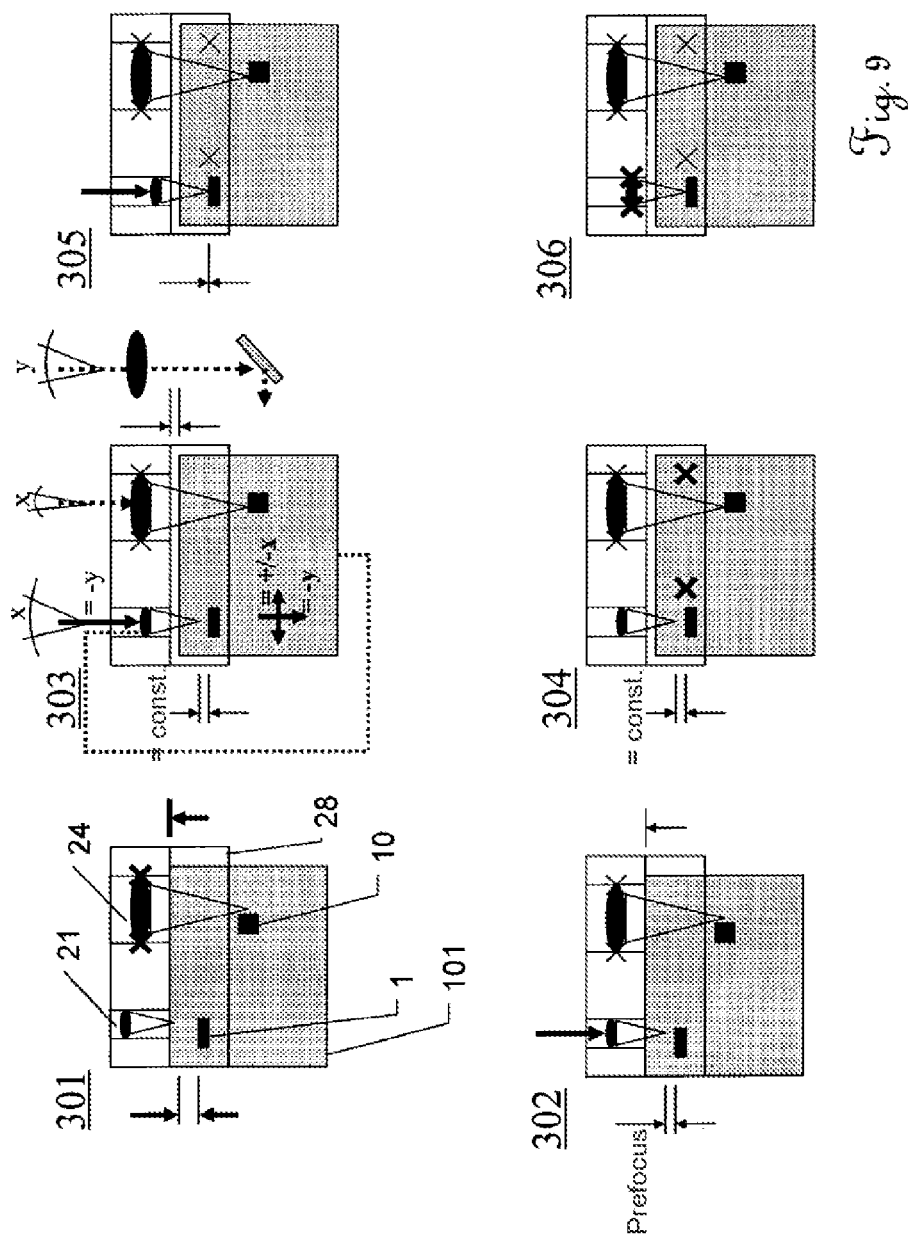

DISTANCE-MEASURING DEVICE ALIGNMENT

FIELD OF THE INVENTION

Some embodiments of the invention relates to an adjustment method, and to a distance meter.

BACKGROUND

Optoelectrical distance meters (also referred to as EDMs (electronic distance meters, LRFs (laser rangefinders), LIDAR, etc.) operate on the principle of emitting electromagnetic radiation, usually in the form of pulses of visible or invisible light, in the direction of a target object. This target object sends at least a part of the emitted light back in the direction of the measuring instrument, in which this received light is converted into an electrical signal. With the aid of the required time of flight of the light and the known propagation speed of the light, the distance between the measuring instrument and the target object is determined by an electronic evaluation unit.

Exemplary embodiments of such instruments are to be found, for instance, in Documents EP 2 051 102, EP 1 311 873 or EP 1 913 415, in which further details of the measurement principles may also be found.

The emission of the light should in this case be carried out as a light beam with the smallest possible divergence, for example in order to obtain a clearly defined measurement point on the target object, as well as to keep the light signal intensity at the measurement point high even in the case of large measurement distances, and inter alia also to obtain a clearly visible measurement point on the target object when using visible light.

In order to obtain such a light beam with small divergence, corresponding collimation optics or emission optics are provided, which need to be adjusted accordingly relative to the light source in order to achieve the desired beam divergence. Semiconductor light sources such as laser diodes or LEDs are preferably used as the light sources, laser emitters being used most often owing to their generically small beam divergence. The collimation optics may be configured as a simple optical lens, or alternatively as more complex optics. Owing to manufacturing tolerances, particularly in the case of large measurement distances, it may be necessary to adjust the collimation optics separately for each instrument in the scope of the manufacturing process of the EDM.

Also when receiving the light, reception optics, for example a converging lens, are mostly used which focus the light from the target object direction onto a photosensitive component, for example a photodiode, especially a PIN photodiode or APD. In this way, the light-receiving cross-sectional area of the instrument, with which the light sent back is acquired, can be increased in relation to the relatively small light-sensitive region of the photosensitive component. The intensity of the optical signal on the receiver element can be increased by a large aperture of the reception optics. The active areas of the photosensitive component usually need to be kept small for other reasons, for example in order to avoid saturation by ambient light, and also since the reaction time or bandwidth of the receiver decreases with an increase in the active area.

The reception optics also need to be oriented in terms of their focus relative to the electro-optical reception element, larger dimensional tolerances usually being permissible in this case than when collimating the emitter. The main purpose of the reception lens is to collect the received light, an exact sharp image of the target on the receiver not being absolutely necessary.

Both the emission optics and the reception optics may also comprise further optical components besides the aforementioned lenses: for instance wavelength filters, polarization filters, deviating mirrors, etc.

Besides the adjustment of the focusing of the emission and reception optics, the optical axes of the emission and reception beam paths are also to be oriented with respect one another in such a way that the part of the emitted light sent back from the target object actually strikes the receiver. This must be ensured over the entire specified measurement range of the EDM, and requires that the respective two angular directions of the two beam paths are appropriately oriented with respect to one another. The solution of a coaxial emission beam path and reception beam path fulfills this criterion; the optical components required for this are, however, very elaborate. EDMs, in particular simple handheld distance meters, are therefore usually not configured with coaxial beam paths, but instead the emission and reception optics are arranged next to one another. In order to satisfy the orientation conditions, the optical axes of the emission and reception beam paths must at least approximately intersect at a point which lies at a particular distance and not at infinity.

For the reasons mentioned above, adjustment of an emission element, emission optics, reception optics and a reception element with respect to one another is necessary in the scope of EDM manufacture. To this end, when assembling the instrument in the prior art, the emission and reception elements are respectively adjusted separately in terms of their position relative to the associated optics. This, however, means that the emitter cannot be positioned in a fixed way relative to the receiver—at least during the adjustment. For example, the emitter and receiver cannot therefore already be fixed and definitively positioned beforehand on a common prefabricated printed circuit board.

For example, Document EP 1 351 070 is known, in which adjustment of the beam path of a distance meter is carried out by temporarily making the photodiode adjustable in position by means of its electrical contacts and is electrically conductively fixed in its adjusted position on the printed circuit board after the adjustment has been carried out. In other words, for example, a solder point of the photodiode is melted and the photodiode is thus made temporarily movable for the adjustment. In EP 1 752 788, the receiver is rigidly connected to the printed circuit board in at least two directions.

WO 2007/012531 or WO 2007/033860 also disclose distance meter structures and describe their adjustment by movement of the emitter and/or receiver, which are fitted on different printed circuit boards or which (at least during the adjustment) are made movable relative to the printed circuit board. DE 101 57 378 discloses a distance meter having a temperature-compensated arrangement of the optical axes. In EP 1 980 878, emission and reception optics are connected to form a double lens.

For orientation of the optical axes of emission and reception paths, as an alternative optics are also known which are configured displaceably or tiltably relative to the printed circuit board with a fixed emission element and a fixed reception element. Such a mechanical structure, however, proves to be elaborate in design. For example, two optics carriers movable with respect to one another, for emission and reception optics, would impair the mechanical robustness of the EDM system. Adhesive bonding of freely movable adjustable optics in an accurately adjusted position also proves correspondingly difficult and error-prone in the scope of EDM manufacture.

SUMMARY

Some embodiments of the present invention may improve an optoelectronic distance meter, and in particular to simplify its production.

Some embodiments mays improve and simplify the adjustment of the optical emission and reception paths, in particular the adjustment of the angular directions of the optical emission and reception axes with respect to one another.

Some embodiments may also improve and simplify adjustment of the optical path of the EDM, the emission and reception elements of which already being mounted fixed relative to one another as a common module and no longer being movable relative to one another.

Some embodiments may permit the use of a printed circuit board fully equipped with the emission element and the reception element as a finished module, on which no components any longer need to be displaced for the beam path adjustment, but which merely the module as a whole still needs to be adjusted relative to an optics carrier with emission and reception optics.

Some embodiments may simplify the adjustment process of the optical path of an EDM which carries the emission element and the reception element fixed on a common module. This is intended to be done especially from an economic viewpoint, such as simplified assembly during apparatus production, miniaturization, reduction of the number of components and component costs, time saving or simple handling of the adjustment.

The invention relates to an adjustment method for an optoelectronic distance meter. The distance meter comprises a module having a radiation source for emitting optical emission radiation, a detector for receiving optical reception radiation, and a printed circuit board, which are arranged in a rigid spatial relation to one another.

The distance meter furthermore comprises an optics carrier having emission optics and reception optics, an emission direction being defined by the radiation source and the emission optics, and a reception direction being defined by the detector and the reception optics. The emission optics and the reception optics have different focal lengths.

The adjustment method establishes a desired orientation of the emission direction relative to the reception direction.

According to the invention, adjustment is carried out by displacing the entire module relative to the optics carrier, the displacement causing displacement-induced direction angle changes of the emission direction and the reception direction by a lever action of the different focal lengths of respectively different size. The orientation of the emission direction relative to the reception direction is varied by these direction angle changes of different sizes.

The module is an inherently fixed unit in which, in particular, the radiation source and the detector are immovable relative to one another in their position, that is to say they cannot be varied in position or orientation with respect to one another temporarily even for adjustment purposes. For example, a module may be formed in the manner of a printed circuit board equipped in a fixed way with a detector and a radiation source.

The adjustment method may adjust a first angular orientation of the emission direction with respect to the reception direction by the displacement in a first lateral direction.

The adjustment method may adjust a second angular orientation of the emission direction with respect to the reception direction by the displacement in a second lateral direction. In one embodiment, the first lateral direction and the second lateral direction may in this case be independent of one another, and in particular they may be orthogonal to one another.

The respectively associated first and second angular orientations, which are brought about by the respectively associated displacement, may also be independent of one another, and in particular they may be orthogonal to one another.

During the adjustment method, it is also possible to vary only the reception direction, and to leave the emission direction unchanged, by the displacement in the second lateral direction. For example, the emission direction with respect to the optics carrier may remain unchanged in the second angular orientation in the scope of the adjustment.

Bearing on a common support surface of the optics carrier and the module may in this case define the direction of the lateral displacement. The bearing surface can therefore be used to establish a degree of freedom orthogonally to the plane of the lateral displacement. In other words, the bearing surface may define a plane in which the module can be displaced laterally relative to the optics carrier.

During the adjustment, the position of the emission optics relative to the reception optics may remain unchanged, in particular unchanged in a direction orthogonal to the optical axis of the optics or with respect to tilting of the optical axes. The emission optics and/or the reception optics may in this case be displaced at most only in the focus direction, that is to say in the direction of the optical axes of the optics, especially for correction of the focusing of the optics.

The position of the emission optics in the optics carrier may already be definitively fixed before the adjustment, including in their axial focus direction.

Before the adjustment, the position of the emission optics in the optics carrier may be precollimated into a prefocus setting, in which a divergence of the emission radiation emitted by the distance meter is greater than that of optimal collimation. In this case, in particular, the focus setting may be achievable from the prefocus setting by displacement, in particular pressing, of the emission optics into a tubular recess of the optics carrier.

The adjustment method may maintain the precollimated prefocus setting of the emission optics with respect to the radiation source during the adjustment, especially by joint displacement of the emission optics with the module in the focus direction of the emission optics.

After the adjustment and after fixing of the module relative to the optics carrier, the adjustment method may comprise collimation of the emission optics in the focus setting direction in order to adjust a desired divergence of the emission beam path emitted by the distance meter, in particular by pressing the emission optics into a tubular recess of the optics carrier.

During the adjustment method, before the precollimation of the emission optics into a prefocus setting, positioning of the module relative to the optics carrier may be carried out into a position from which the module can be displaced only in the direction of decollimation of the emission optics or orthogonally thereto. In this way, even after adjustment-related displacement, achievability of definitive collimation of the emission optics in the focus setting may be ensured, in particular by pressing the emission optics into the optics carrier in the direction of collimation.

The emission optics and/or the reception optics may in this case comprise a deviating mirror, for example to establish independence of the first and second angular orientations.

The desired orientation of the emission direction relative to the reception direction may be defined in that the emission direction and the reception direction at least approximately have a common point of intersection at a predetermined distance.

The invention also relates to an optoelectronic distance meter, in particular a handheld laser distance meter, having:
- a printed circuit board, an optical radiation source and an optical detector, which are positioned and oriented immovably with respect to one another as a common module,
- an optics carrier having emission optics and reception optics with a respectively different focal length, in particular with the emission optics and the reception optics being displaceable with respect to one another only in the direction of their respective optical axes, and
- an electronic evaluation unit with which a distance from the distance meter to a target object can be determined on the basis of a signal time of flight with the aid of a digitized reception signal of the detector, which is adjusted by an adjustment method according to the invention. In particular, according to the invention the design concept of the distance meter, or the component arrangement in the distance meter, is configured so that the method described above can be carried out with the distance meter.

In the distance meter, in particular, the radiation source may emit parallel to a plane of the printed circuit board in the direction of the emission optics. The detector may have a photosensitive region lying parallel to the printed circuit board. The reception radiation may be directed by the reception optics via a deviating mirror onto the detector. The module may be displaceable relative to the optics carrier in a first direction and a second direction, and may bear on a mechanical stop in a third direction.

In the distance meter, the emission optics may be fitted in a tubular recess of the optics carrier for collimation of the emission beam path, and the emission optics may be axially pressable into the tube.

BRIEF DESCRIPTION OF THE DRAWINGS

The method according to the invention and the device according to the invention will be described in more detail below, purely by way of example, with the aid of specific exemplary embodiments schematically represented in the drawings, with further advantages of the invention being discussed. In detail:

FIG. 7 shows an exemplary fifth embodiment of beam path adjustment, according to the invention, of an EDM;

FIG. 8 shows an exemplary sixth embodiment of beam path adjustment, according to the invention, of an EDM;

FIG. 9 shows an exemplary second process representation of EDM assembly with a beam path adjustment according to the invention.

DETAILED DESCRIPTION

The representations in the figures merely serve for illustration, and are not to be considered as true to scale.

Figure 1:
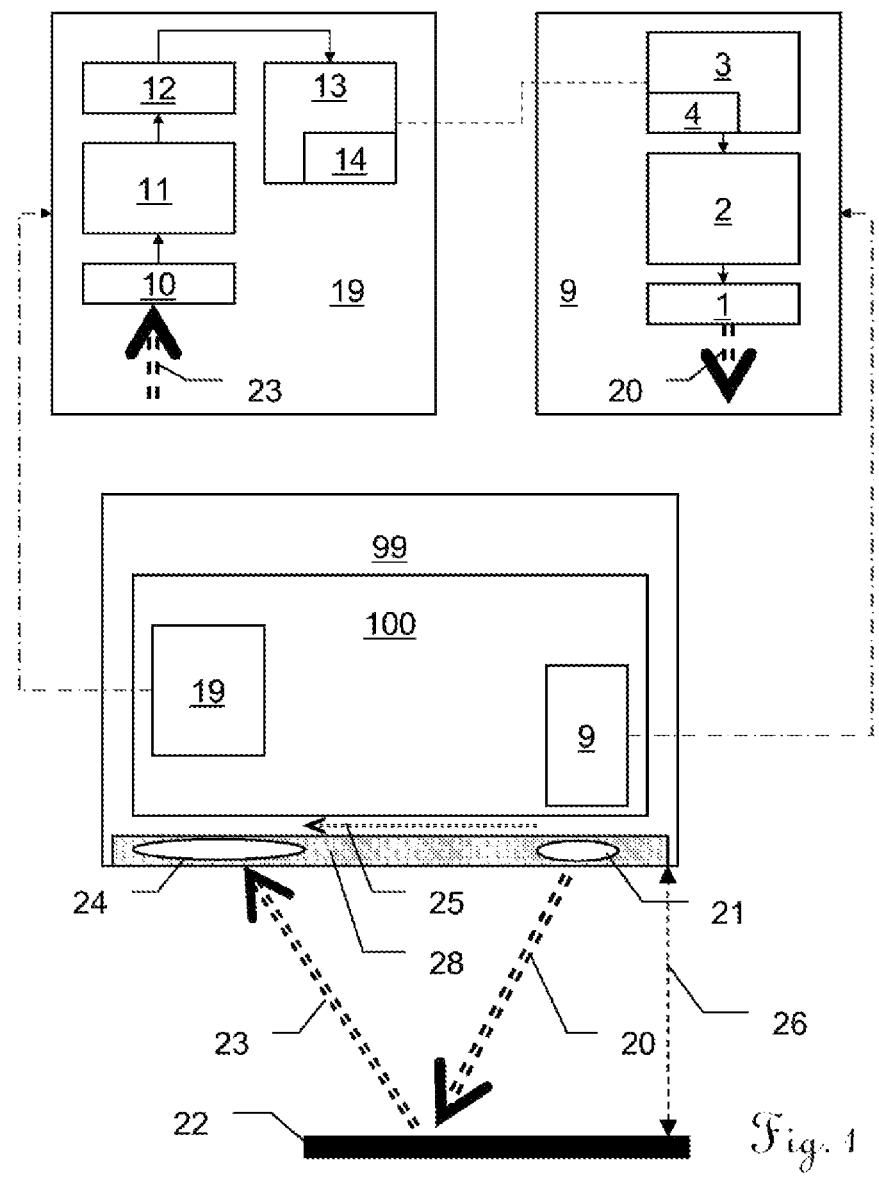
FIG. 1 shows a first embodiment of a distance meter according to the invention as a block diagram.

FIG. 1 shows an embodiment of an optoelectronic distance meter 99 according to the invention as a block diagram. It may, for example, be a handheld battery-operated distance meter or another surveying device, such as are widely used for example in the construction sector. Two separate blocks of the emission unit 9 and the reception unit 19 are represented in the lower half of the figure. The separation represented is primarily to be regarded as functional, and need not be constructed in the form of two physically separate units. The emission and reception units shown are both premounted as a common module 100, for example on a common printed circuit board, and form a fixed unit immovable relative to one another. The module 100 may be constructed as a common printed circuit board, on which the emission unit 9 and the reception unit 19 are soldered or conductively adhesively bonded. The emission unit 9 and the reception unit 19 may respectively be constructed in the form of discrete electronics components or as prefabricated submodules, which are fitted on the module 100 in a fixed position relative to one another. A block diagram of an exemplary internal structure of one embodiment of the emission unit 9 and the reception unit 19, respectively, is represented in the upper half of the figure.

The target object 22, the distance 26 of which is to be determined, sends at least a part of the electromagnetic radiation 20 emitted by the emission unit 9 back as a reception signal 23 to the reception unit 19. A part of the emitted radiation may also be guided as a reference beam 25 along a reference path of known length to the reception unit 19. Two separate reception units or one common reception unit 19 may in this case be provided for the reference beam 25 and the measurement beam 23. In the case of a separate reference receiver, the reception unit 19 or parts thereof (for example 10, 11, 12) are correspondingly to be duplicated. Switching between the reference beam 25 and the measurement beam 23 is also known. For example, EP 0 738 899 discloses a switchable reference path 25, EP 0 932 835 discloses the use of two reception units 19, and DE 40 02 356 discloses use of two switchable emission units 9.

The emission unit 9 with a control processor 3 and a driver stage 2 for the emitting components 1, which converts the electrical signals of the driver stage 2 into electromagnetic radiation 20 (for example a laser diode with stimulated emission, an LED, or another electrically drivable light source,). In the control processor 3, a PLL 4 is represented, which may alternatively also be arranged in common with the driver stage 2, or externally therefrom. The control processor 3, the driver stage 2 and the PLL 4 may also be integrated in a common chip, for example an ASIC or FPGA. The emission unit 9 is formed in such a way that it can emit modulated optical radiation, in particular radiofrequency intensity-modulated optical radiation, in the visible or invisible spectral range, according to a pattern dictated by the control unit, for example in the form of short high-intensity light pulses, burst-like packets of light pulses, or another intensity profile, such as a sine, sinc, raised cosine, triangle, rectangle, trapezium, etc.

The reception unit 19 converts electromagnetic radiation 23 received by the reception element 10 into an electrical signal which—optionally amplified—is conditioned (for example filtered, mixed in a heterodyne or homodyne fashion, amplified, etc.) in block 11 as a conditioning unit for the further processing. The conditioning unit 11 may thus for example comprise an input filter, an amplifier, a mixing stage, a sample & hold component, etc., or a combination thereof. One example of the many possible signal filterings in the conditioning 11 is disclosed, for instance, in WO 2011/076907 or EP Patent Application No. 11187964.9. The receiver 10 of the optical radiation 23 may use a photodiode as the reception element, for example an avalanche photodiode with a corresponding bias voltage, or a PIN photodiode. The radiofrequency electrical output signal—corresponding to the modulation of the emitted optical signal 20 (and therefore of the received optical signal)—of the photosensitive element 10 may be prepared before the further processing or in the scope of the conditioning 11, in particular impedance-converted, amplified and/or band-limited (for instance with an active or passive analog filter, a transimpedance amplifier (TIA), . . . ). For example, such an amplifier stage may also comprise inter alia a circuit according to EP 2 183 865.

The conditioned reception signal is digitized—i.e. quantized in time and value—by an analog/digital converter 12 and delivered to a digital calculation unit 13 (a microprocessor, DSP, FPGA, ASIC, etc.) for further processing and determination of the distance. A clock generator 14, for example a quartz crystal as an oscillator, and a PLL are furthermore shown.

For the distance measurement, coordination of the emitter 9 and receiver 19 is also necessary, for instance a communication link and or synchronization to control the processes necessary for the measurement. As mentioned, the separation represented is to be regarded as functional, which may mean that the emission unit 9 and the reception unit 19, or parts thereof, may also be configured as a common chip, for example the calculation units 10 and 3, or others. As described, the emitter and receiver are physically accommodated on a common module 100, for instance a printed circuit board, in which case printed circuit boards may also mean carrier substrates of circuits in thick-film or thin-film technology. A structure of the module 100 with a plurality of separate printed circuit boards as submodules is likewise to be regarded as a module 100 in the context of the invention, when they are firmly connected to one another and, during the adjustment described here, the emission element 1 is not moved, even temporarily, in its position and/or orientation relative to the reception element 10.

In order to be able to carry out a distance measurement, the emitted radiation 20, or more precisely the part of the radiation 23 sent back from the target object in the direction of the distance meter, must strike the receiver element 10. In order to ensure this, the EDM 99 has emission optics 21 and reception optics 24, both of which are represented here respectively by a converging lens (as one of the simplest embodiments) in an optics carrier 28. The emission optics 21 and the reception optics 24 respectively form an emission beam path and a reception beam path, each of which can be described by an optical axis that extends through the emission element 9 and the reception element 19, respectively. The optics may consist of glasses or plastics suitable therefor, for example Zeonex or other plastics especially suitable for optical components, and they may also have a wide variety of optical coatings, for example blooming, wavelength filters, etc.

In order to extend the lateral angle range which the reception optics 24 can acquire, in particular toward shorter distances, optics with lateral distortion are also known, so-called near-field optics, for example in the form of segmented lenses. Such distorting optics may be used to widen the measurement range which the receiver can see, in particular for a widened near field. A widened near field may also be reflected in onto the receiver by means of an appropriately fitted mirror.

The purpose of the emission optics 21 is to form a beam which is as collimated as possible, so as to obtain a clearly defined measurement point as well as a sufficiently optical signal energy density on the target object 22, even in the case of long measurement distances 26. A predetermined divergence of the emission beam path, which is usually as small as possible, is thus desirable. By way of example, emission optics 21 as a plastic or glass lens, for example with a diameter of from 5 mm to 15 mm, in particular about 6.5 mm, and with a focal length of from 5 mm to 30 mm, in particular 9 mm, may be used in a handheld distance meter 99.

In one embodiment with a semiconductor laser as the light source 9, which per se may for instance have a divergence of about 30°, this may for example be achieved by a collimation lens in the form of a converging lens with a relatively short first focal length. Since the emission beam 20 generally has a small diameter, for example of the order of a few millimeters, a lens with a sufficiently small diameter, for example about 1.5 to 5 times the beam diameter, is usually sufficient in this case. Purely in technical terms, larger lenses or more complex emission optics 21 could also fulfill this function, although dimensions in the ranges mentioned above are employed in EDMs for cost reasons and with a view to a compact device design.

The purpose of the reception optics 24 is to collect as much as possible of the light 23 sent back from the target object 22 and direct it onto the sensitive region of the reception element 19. In simplified terms, this may also be described as the reception optics 24 imaging the target point of the distance measurement onto the reception element 19, an exactly sharp image not being absolutely necessary for the distance measurement, but rather primarily concentration of the light acquired by the reception optics 24 onto the active area of the optoelectrical reception element 19, which has a smaller cross section. The reception beam path is thus configured in such a way that the target point on a target object 22 can be acquired by the reception element 19 within the entire specified measurement range of the EDM, in which case, with a correspondingly high reception signal intensity, only partial acquisition of the target point may be sufficient, for example in the near field. As an example, reception optics 24 as a plastic lens, for example with a diameter of from 15 mm to 50 mm, in particular about 18 mm, with a focal length of from 15 mm to 100 mm, in particular about 30 mm, may be used in a handheld distance meter.

Since coaxial emission and reception beam paths can only be achieved with very elaborate optics, an arrangement of the emission optics 21 and reception optics 24 next to one another is usually selected, which is also referred to as a para-axial arrangement.

The purpose of the adjustment may be described as orienting the optical axes of the emission and reception beam paths in such a way that they at least approximately intersect at a point at a defined distance. The term "at least approximately" is in this case intended to express the fact that intersection of the two axes need not necessarily be established accurately down to the millimeter range, for instance, but that much larger tolerances may be permissible for this. The above-described aquirability of the light sent back from a target point over the entire distance measuring range may be regarded as a primary condition. For large distances, the two optical axes may be regarded as almost parallel to one another, so that there is a grazing intersection of the two optical axes, which may make exact determinability of the point of intersection at the predetermined distance more difficult. The at least approximate intersection of the optical axes may also be expressed in the condition that the measurement light point projected by means of the emission optics 21 onto the target object 22 is directed by the reception optics 24 onto the reception element 10.

The absolute accuracies required in this case depend in detail on the respective embodiment, in particular of the emission optics 21, reception optics 24, emission beam diameter and emission beam divergence, specified distance measurement range, component arrangement, etc. In other words, the field of view of the receiver 10 must acquire (in particular as centrally as possible) the emission beam 20 striking a target object 22 set up at the defined distance, so that emission light points on target objects 22 remain acquirable even at distances 26 which are greater or less than the defined distance, with a corresponding deviation from the center (due to the angular deviation of the emission and reception directions), the acquirable range corresponding to the distance measurement range of the EDM. In this case, special reception angle-dependently distorting reception optics 24 are also known, which in particular widen the acquirable near field of the receiver.

For reasons of space, the emission and reception directions defined by the optical axes are represented very obliquely with respect to one another. In practical embodiments, particularly for measurements of larger distances 26, the beam paths are usually at a much shallower angle to one another than is represented here.

During mounting (or setting up, calibration or recalibration) of the EDM 99, the optical axes of the emission and reception beam path, or the emission and reception directions, must be oriented appropriately with respect to one another. The present invention relates to an adjustment method therefor, and to corresponding distance meters 99 with which the method according to the invention can be carried out, which will be explained in the form of exemplary embodiments and from which design differences are also possible. The invention therefore also comprises a device with which an adjustment according to the invention can be carried out.

Figure 2:
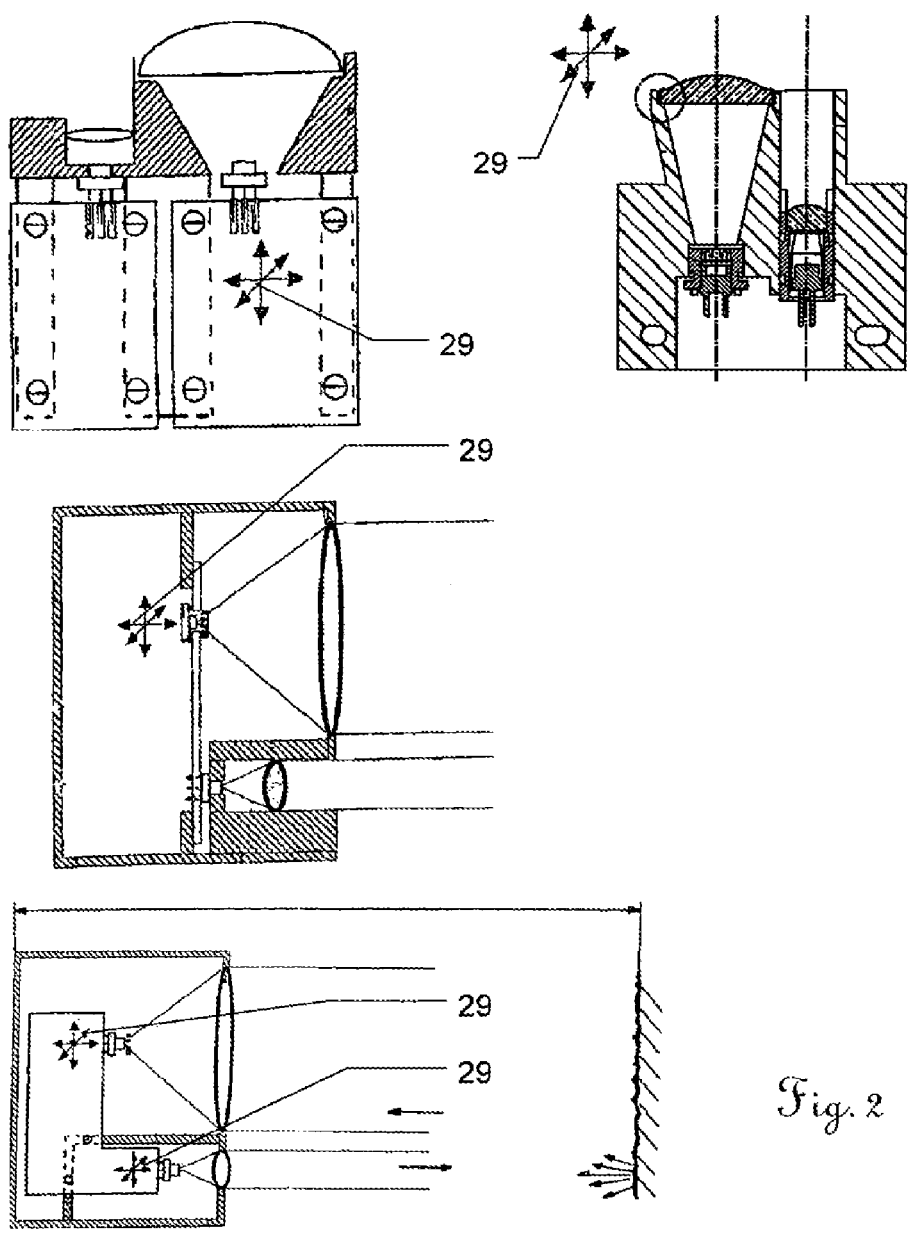
FIG. 2 shows exemplary representations of known adjustment principles of EDM beam paths.

FIG. 2 illustrates some of the adjustment methods known from the aforementioned prior art for para-axial distance meters according to the invention, in which either the emitter is moved relative to the receiver or, alternatively, the emission optics are moved relative to the reception optics, in order to achieve adjustment of the emission direction relative to the reception direction. The mobility of the elements for the adjustment is respectively illustrated by crossed arrows 29.

Figure 3A:
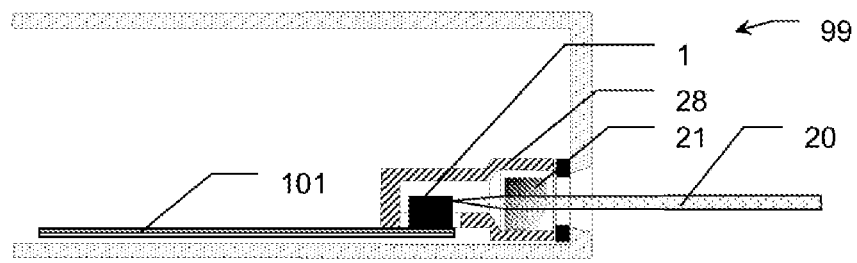
FIG. 3a shows a schematic representation of a first section through a first exemplary embodiment of an adjustable EDM emission unit according to the invention.
Figure 3B:
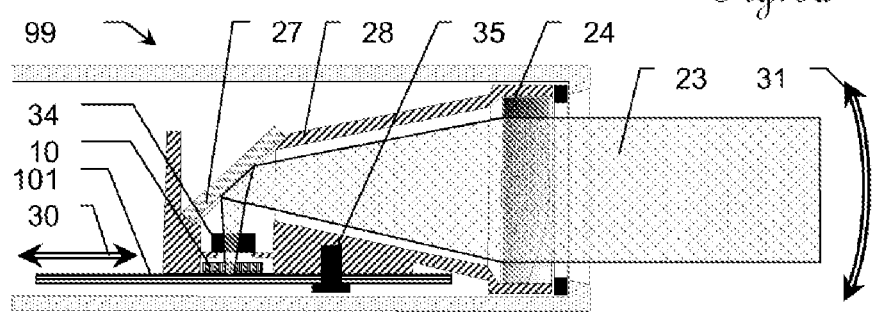
FIG. 3b shows a schematic representation of a second section through a first exemplary embodiment of an adjustable EDM emission unit according to the invention.
Figure 3C:
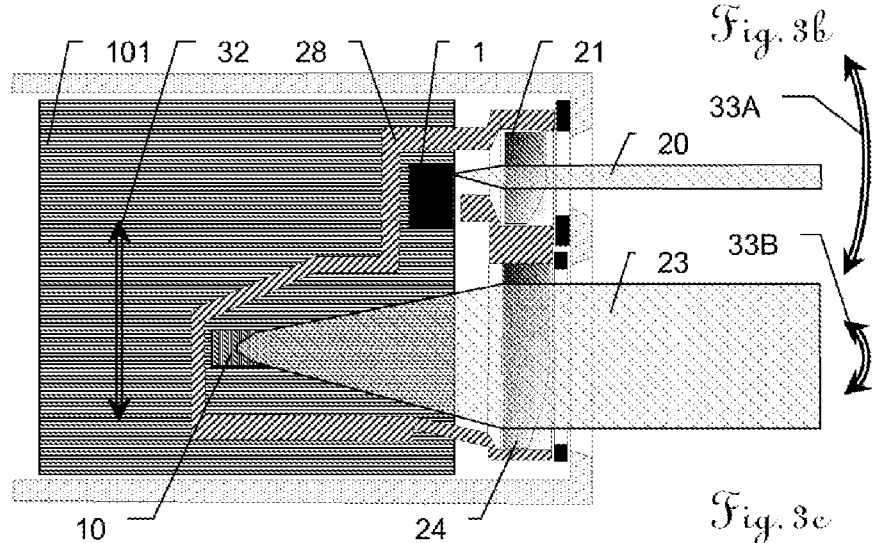
FIG. 3c shows a schematic representation of a third section through a first exemplary embodiment of an adjustable EDM according to the invention, which is orthogonal to those of FIGS. 3a and 3b.

FIGS. 3a, 3b and 3c show an exemplary embodiment of an EDM 99 in different sectional representation, not all parts of the EDM 99 being represented.

FIG. 3a shows a section through the emission element 9, which forms the rigid module 100 with the printed circuit board 101, and the associated emission optics 21 which are fitted on the optics carrier 28. The electro-optical emission element 1 as a light emitter emits an optical emission beam path 20, which is shaped by the emission optics 21. As described above, a desired small divergence of the emission beam path 20 should be achieved in this case, i.e. the natural divergence of the emission element should be reduced to at least approximately zero. In the embodiment shown, this is achieved by emission optics 21 in the form of a collimation lens, which can be characterized by a focal length. The light source 9 is located at least approximately at the focus of the collimation lens as emission optics 21.

Compared with the known prior art, the distance meter structure according to the invention with a rigid module 100 leads to a reduction of the number of moving parts in the instrument, so that it becomes more robust and more stable, for example including in respect of possible deadjustment effects during use on building sites by impacts, vibrations, etc. Such a structure is made possible for the first time by the adjustment method according to the invention, since it has not been possible to carry out the known adjustment methods with a rigid structure of this type.

According to the invention, an already fully prefabricated rigid module 100 may be installed in the EDM 99 during assembly. The already complete module 100 can therefore already be subjected before its installation to a complete function test, by which all electronic components, especially the light emitter and the photosensitive detector, can be included in the way in which they are subsequently present in the finished instrument. The assembly of the instrument can therefore also take place without soldering processes.

FIG. 3b shows a section through the optoelectrical reception unit 19, which forms the rigid module 100 with the printed circuit board 101, and the associated reception optics 24 which shape the reception beam path 23 and are located in the optics carrier 28 in which the emission optics 21 are also located, or which are rigidly connected to the emission optics 21. In this embodiment, the reception beam path 23 is shaped not merely by the reception optics 24, but also by a deviating mirror 27. The reception beam path 23 may for example also—as shown here—have a wavelength filter 34, which attenuates light outside a wavelength range of the emission radiation 20. The reception optics 24 may in turn be characterized by a focal point and have the reception element 10 arranged at least approximately at their focus, which in this particular embodiment is deviated by the mirror element 27.

FIG. 3c shows a section through the EDM 99, which is orthogonal to the previous ones and represents the module 100 with the optoelectrical reception element 10, the electro-optical emission element 1 and the printed circuit board 101. The optics carrier 28 with the emission optics 21 and the associated emission beam path 20, as well as the reception optics 24 and the associated reception beam path 23, are also represented.

The method for the adjustment according to the invention is carried out by moving the module 100 with the printed circuit board 101, on which the emission element 1 and the reception element 10 are fitted and remain in a prefabricated fixed position and orientation with respect to one another. In the embodiment shown, the printed circuit board 100 bears from below on the optics carrier 28, so that a mechanical stop is formed in this Z direction, which dictates the position of the module 100 with respect to the optics carrier 28 in this Z direction.

The module 100 can therefore still be moved, or displaced, in a first lateral X degree of freedom 30 and in a second lateral Y degree of freedom 32. A displacement in the X direction 30 has no direct effect on the emission direction of the emission beam path 20, as can be seen from FIG. 3a. The displacement in the X direction 30 does, however, have an effect on the vertical reception direction 31 of the reception beam path 23, which is symbolized by the curved arrow 31 in FIG. 3b, representing a corresponding tilt in the vertical direction. In this embodiment, therefore, the vertical orientation of the reception direction with respect to the emission direction can be adjusted with the aid of a movement of the module 100 relative to the optics carrier 28 in the X direction 30. The displacement in the X direction 30 causes a displacement-dependent direction angle change of the reception direction with respect to the emission direction, particularly in a vertical first angular direction of the emission or reception direction, so that the beam path of the EDM can be adjusted in a first angular direction.

Movement in the second lateral Y degree of freedom 32 causes a horizontal direction angle change both for the emission direction and for the reception direction. The adjustment method according to the invention in this case uses the lever action occurring because of different focal lengths of the emission optics 21 relative to the reception optics 24, which causes a different displacement-induced direction angle change of the emission and reception direction. Horizontal adjustment of the emission direction relative to the reception direction can thus be achieved by a displacement in the Y direction 32.

In combination, the emission and reception directions can thus be adjusted relative to one another, so that a common point of intersection of the optical axis of the emission beam path relative to the optical axis of the reception beam path can be established at least approximately at a predetermined distance. Since only relatively minor adjustments, due to manufacturing tolerance, of the emission and reception directions usually have to be carried out in the scope of the adjustment, the angle changes achievable according to the invention are sufficient, particularly since the emission element and the reception element can be fitted with a high dimensional accuracy in the submillimeter range during manufacture of the module. An example which may be mentioned for practically achieved values of the displacement length and the angle setting errors which can thereby be corrected in an exemplary embodiment is adjustment of a horizontal laser setting error in an angle range of about ±1.5° by a displacement of about ±0.5 mm and adjustment of a vertical laser setting error in an angle range of about ±1.2° by a displacement of the module of about ±1 mm. By adaptations of the geometrical situation in other embodiments, adjustments according to the invention with numerical values differing from the example above may also be achieved.

After adjustment has been carried out, the module 100 may be fixed in its position relative to the optics carrier, for example by screwing it tight, clamping it or adhesively bonding it.

The emission and reception directions to be set in the scope of the adjustment may be described by two mutually orthogonal angular directions. In this document, the first component of the emission or reception direction will also be referred to as a horizontal direction, and the second component of the emission or reception direction will also be referred to as a vertical direction of the emission or reception beam path, horizontal and vertical not indicating absolute spatial positions; rather, the terms are merely used to make them easier to distinguish and, in absolute terms, they naturally depend on the current spatial position of the EDM 99. In addition, the adjustment method may also be extended by setting the focusing, particularly by exact adjustment of the collimation of the emission beam path 20, for which greater accuracy requirements are usually to be placed on the focusing than in the case of the reception beam path 23.

The method used according to the invention during the adjustment makes use of the different focal lengths of the two sets of optics in order to achieve relative movement of the optical axes of the emission beam path 20 with respect to the reception beam path 23, by means of which the adjustment is carried out in such a way that the measurement beam path of the EDM follows the desired profile and possible manufacturing tolerances etc. are compensated for. According to the invention, this is achieved by displacement of a module 100, on which the emitter 1 and the receiver 10 have an invariant position with respect to one another. The emitter 1 and the receiver 10 are always displaced together. During the adjustment of the directions of the beam paths, the emission optics 21 and the reception optics 24, relative to which the module 100 is displaced for the adjustment, are also not moved relative to one another or relative to the optics carrier 28 carrying them, in such a way that changes the emission direction and/or the reception direction.

In correspondingly configured embodiments, the two possible beam angle directions may be adjusted independently of one another by two orthogonal movements of the module. For example, a movement in the X direction may lead to adjustment of the horizontal angle, and a movement in the Y direction may lead to adjustment of the vertical angle of the EDM beam path.

Figure 4:
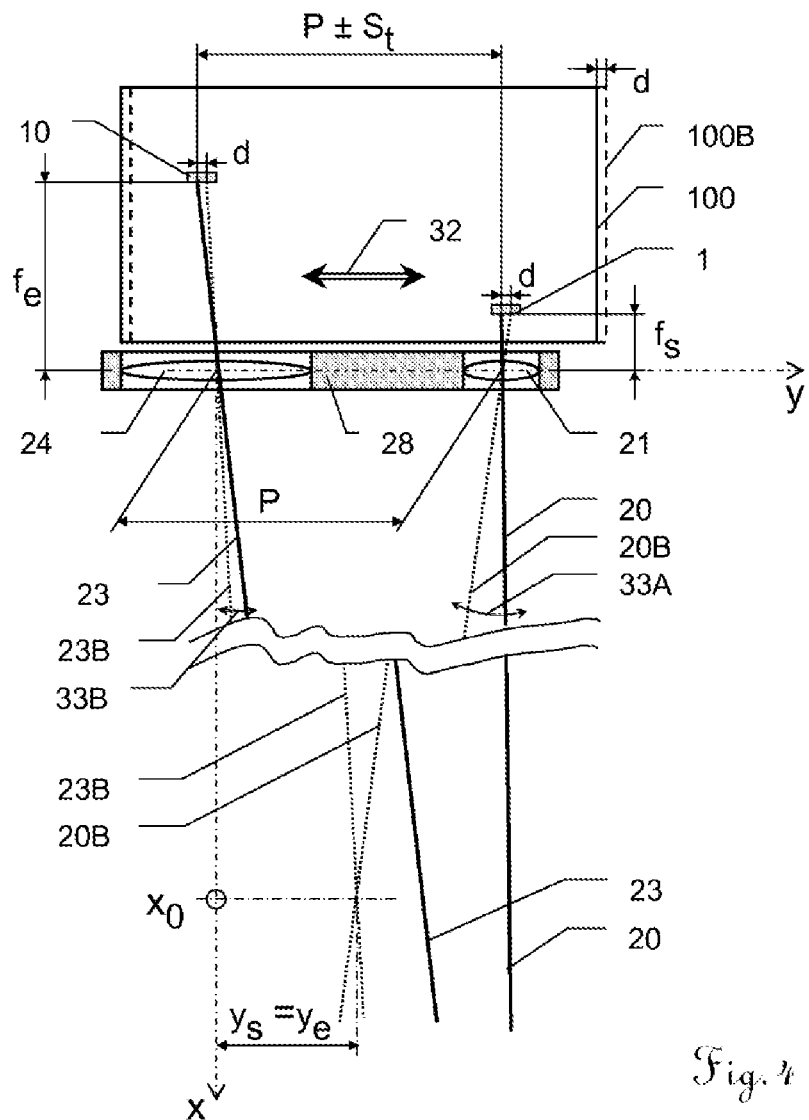
FIG. 4 shows an exemplary second embodiment of an adjustable EDM according to the invention in one direction.

FIG. 4 in turn schematically illustrates an exemplary embodiment to explain the method according to the invention for adjustment of an EDM beam path, in a one-dimensional representation. A linear displacement 32 of the module 100, that is to say a common displacement of the electronic emission element 1 and the reception element 10, relative to the emission optics 21 and reception optics 24 is shown. The effect of this displacement on the emission and reception directions is shown by the respective angle change 33A of the emission direction and 33B of the reception direction. These angle changes depend both on the displacement length and on the ratio of the emission focal length $f_s$ of the emission optics 21 to the reception focal length $f_e$ of the reception optics 24. In practical embodiments, for example, a focal length ratio of the reception optics to the emission optics of about 1:1.1 to 1:10 may be used, in particular from 1:2 to 1:5, especially about 1:3.

The solid lines 20 and 23 represent the initial state before the displacement, and the broken lines 20B and 23B represent the displaced state in which the module 100 is displaced relative to the optics 21 and 24 in the optics carrier 28 by the length d into the position 100B. It is clear to the observer that the broken lines 20B and 23B intersect in their extension at a point which lies closer to the distance meter 99 than the point of intersection of the solid lines 20 and 23 before the displacement by the value d in the direction 32, which allows adjustment according to the invention of the beam path of the distance meter 99. The principle shown, which is one-dimensional in this case, may also be extended to a second dimension; the focal length ratios may be changed, etc.

The Y position $y_e$ of the beam path 23 at the distance x is given for the reception beam by $y_e = k_s \cdot x + 0$, and the Y position $y_s$ of the beam path 20 at this distance x is given for the emission beam with the parallax P of the two optics 21, 24, i.e. an offset of the optical axes of the emission optics 21 relative to the reception optics 24, by $y_s = k_s \cdot x + P$.

With the emission focal length $f_s$ of the emission optics 21 and the reception focal length $f_e$ of the reception optics 24, for a displacement d as represented of the module, the values of $k_s$ and $k_e$ are given by $$k_s = \frac{d \pm S_t}{f_s} \text{ and } k_e = \frac{d}{f_e},$$

where $S_t$ is a fitting tolerance of the emission element 1 relative to the reception element 10.

A common point of intersection at a predetermined distance $x_0$ is achieved when $y_z(x_0) = y_e(x_0)$, i.e. when $k_s \cdot x_0 = k_s \cdot x_0 + P$, from which the predetermined distance $x_0$ can be determined by $$x_0 = \frac{P}{k_e - k_s}.$$

The setting of the intersection distance $x_0$ of the emission and reception beam paths is therefore given in the embodiment represented by $$x_0 = \frac{P}{d} \cdot \left( \frac{f_e \cdot f_s}{f_s - f_e \pm S_t / d} \right).$$

With reference to the example of the embodiment shown, this explains how a desired predetermined distance $x_0$ can be set by a common displacement d of the emission and reception elements, and so that possibly existing fitting tolerance $S_t$ can therefore be compensated for without having to change the position of the emission element 1 relative to the reception element 10 and/or the y position of the emission optics 21 relative to the reception optics 24.

Figure 5:
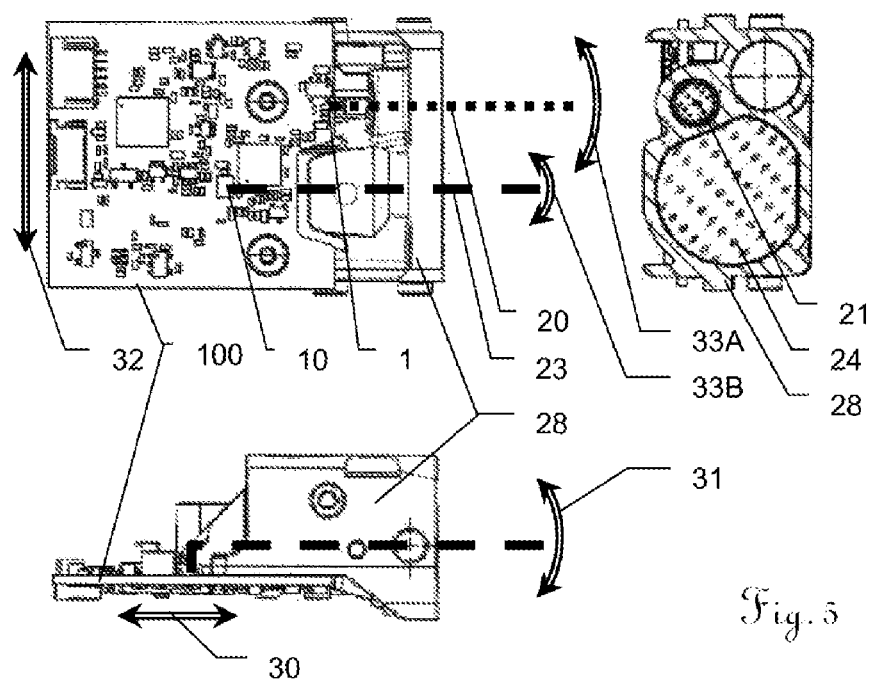
FIG. 5 shows an exemplary third embodiment of beam path adjustment, according to the invention, of an EDM.

FIG. 5 represents a further exemplary embodiment of a structure according to the invention of an EDM 99 for the adjustment according to the invention. By a displacement of the printed circuit board 101 in the direction 32, the exit angle of the optical axes from the optics carrier 28 with the reception optics 24 and the emission optics 21 is respectively varied differently in a first direction, as symbolized by the curved arrows 33A and 33B. A displacement of the printed circuit board 101 in the direction 30 modifies the optical axis of the reception beam path 23 in a second direction, which is represented by the curved arrow 31.

Figure 6:
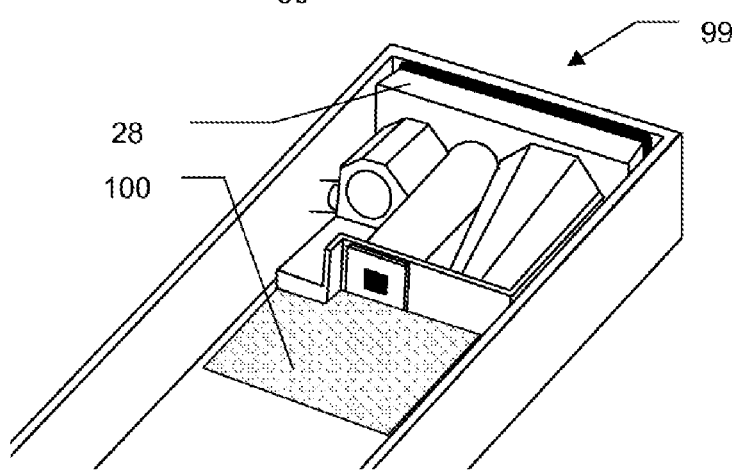
FIG. 6 shows an exemplary fourth embodiment of an adjustable EDM according to the invention in a 3D view.

FIG. 6 shows a 3D representation of an EDM 99, which can be adjusted according to the invention, with an optics carrier 28 and a module 100 which comprises at least the emission element 1 and the reception element 10 in a spatially determined fixed position with respect to one another.

FIG. 7 illustrates an embodiment in which deviation of the emission beam path 20 and the reception beam path 23 is carried out. If the design embodiment shown here has at least one deviating mirror, then the structure can be configured in a similar way to the embodiments of FIGS. 3a, 3b, 3c or FIG. 5, in which case the emission angle direction 31B is not influenced by the adjustment. According to the invention, other embodiments with other arrangements of deviating mirrors, for example only in the emission beam path 20 or in both beam paths 20 and 23, are possible, which changes the effects of a movement on the direction change of the beam path. According to the invention, however, the different focal lengths of the emission optics 21 and the reception optics 24 are always used in order to adjust at least one component of the emission direction 33B and/or 31B and the reception direction 33A and/or 31A with respect to one another, in order to establish or displace the point of intersection 36.

FIG. 8 illustrates an alternative embodiment, which does not have a deviating mirror. Here, the light-sensor element 1 is configured for example as a flat SMD photodiode with a light-sensitive surface parallel to the printed circuit board 101. The light source 1 also emits at least approximately orthogonally to the printed circuit board 101, for example in the form of a vertically emitting laser diode, an SMD LED or a correspondingly mounted semiconductor laser. The two photoelectric components 1 and 10 and the printed circuit board 101 are again premounted positionally fixed with respect to one another as a module 100, and the module 100 can be moved for adjustment purposes as a whole relative to the optics carrier 28 with the emission optics 20 and the reception optics 24. In this case, a movement in the direction 32 causes different angle changes of the beam paths 20 and 23 in the directions 33A and 33B. A movement in the direction 30 respectively causes different angle changes of the beam paths 20 and 23 in the directions 31A and 31B. A movement in the direction 39 causes a focus change; the adjustment of the focus according to the invention may also be carried out as otherwise described. The different focal lengths $f_e$ and $f_e$ may on the one hand be taken into account by the emission element 1 and reception element 10 extending differently from above the printed circuit board 101 and/or by the represented axial offset of the emission optics 21 and the reception optics 24.

FIG. 9 represents a possible embodiment of an adjustment process in an EDM, which also carries out adjustment according to the invention of the orientation of the optical axes of the emission and reception beam paths. The embodiment shown for adjustment according to the invention of an EDM 99 in the scope of illustrations of process steps, which illustrate an exemplary process of an EDM adjustment. Besides the directional adjustment according to the invention, further optional steps of EDM adjustment are also represented.

In the first image 301, the prefabricated module with the emitter and receiver and the optics carrier with the emission and the reception optics are premounted, that is to say the optics carrier and the module are still mounted movably with respect to one another. The component group bears orthogonally with respect to the plane of the drawing (Z direction) on the optics carrier, and thus has a mechanical stop in this direction. During the premounting, the module is also positioned far forward in the Y direction, i.e. as close as possible to the optics. The module and the optics carrier, however, are not yet fixed with respect to one another but displaceable with respect to one another in the X-Y plane, albeit with a restricted displacement range. This may for example be done using only loosely tightened screws from below through the module into the optics carrier, the holes provided therefor in the module having a diameter greater than the outer diameter of the screws so that relative displacement in the X-Y direction is still possible. In this case, the screws may be only loosely tightened, or this position may be ensured by a device and the screws may be used only in the scope of fixing the adjusted position. The reception optics may usually already be premounted in a fixed way in the optics carrier and, for example, also adhesively bonded, since by virtue of its function the requirements thereon for maintaining exact focusing are less, inter alia because of the longer focal length.

As shown by image 302, in this premounted position only the emission optics, here represented as a collimation lens in the optics carrier, can be brought into a prefocus position, for example by pressing the lens from the front into a tubular recess of the optics carrier, in which the collimation lens may also already have been premounted. Since, owing to adjustment, possible corrections are however still necessary, this process may as mentioned be interrupted shortly before reaching the focus position, for example about 50 μm before the focus position. The beam emitted by the emission element therefore has a sufficiently small divergence for the subsequent adjustment.

Image 303 shows the core of the adjustment method according to the invention, in which the emission and the reception beam paths can be orientated with respect to one another by moving the module relative to the optics carrier in the X and Y directions. This is done according to the invention by using the lever action of the different focal lengths of the emission optics and reception optics. Since the premounting in the Y direction was carried out at the front stop in the direction of the lenses, adjustment can be carried out only in the negative Y direction, which causes defocusing of the emission optics. The design layout, taking into account the maximum tolerances, allows adjustment in only one direction without causing the difficulty that adjustment in the other direction has to be carried out in that the premounting position represents an extreme setting. In order to avoid defocusing, the emission optics may in this case be moved jointly displaced in the Y direction during the adjustment, so that the prefocus position is maintained. Since, as described, the reception optics have less stringent requirements on the focal accuracy, joint displacement therewith can usually be obviated. In the embodiment represented, adjustment in the Y direction—owing to the deviating mirror 34 causes vertical adjustment in the emission beam direction, that is to say a rotational movement of the emission beam about the X axis or, in other words, a rotation in a plane normal to the plane of the drawing.

The adjustment in the X direction causes tilting of the emission and reception directions in the plane of the drawing, that is to say about the Z axis. Here, in particular, the effect of the lever action due to the different focal lengths is particularly pronounced, so that the same X movement of the emitter and receiver causes different angular deviations in the emission and reception beam paths. In this way, for example, one beam path may even overtake the other.

The adjustment in the X and Y directions is carried out until the emission direction and the reception direction have the desired orientation with respect to one another, i.e. for example until a point of intersection of the optical axes of the emission and reception beam paths at a point at a particular desired distance is reached at least approximately or sufficiently accurately. This may be done automatically, for example by setting motors and corresponding control logic, semimanually or entirely manually by an operator. A corresponding device may be provided for the adjustment according to the invention.

After adjustment has been carried out, in image 304 the module and the optics carrier are fixed with respect to one another, for example by screwing tight the aforementioned screws, adhesive bonding, clamping, etc.

In image 305—after the module and the optics carrier have been fixed with respect to one another—the collimation lens may be pressed in even further from its prefocus position. Since the focus position of the collimation lens usually has to be set very accurately, for example with tolerances in the range of 2-5 µm, in this first exemplary embodiment this is not done until after the adjustment has been completed, and the rest of the components are fixed in their positions with respect to one another. By virtue of the previously selected prefocus position, reaching of the exact focus position by pressing the lens in forward should be ensured in every case.

If the holding of the press seat of the lens is not robust enough, the emission optics may, as in image 306, be additionally fixed, for example adhesively bonded. This concludes the adjustment of the beam path of the distance meter.

In a way which is apparent for the person skilled in the art, other embodiments of an EDM, which in terms of engineering are adapted or optimized according to the requirements of the specific distance meter, may also be adjusted in accordance with the method according to the invention.

What is claimed is:
1. An adjustment method for an optoelectronic distance meter, which comprises:
a module having
a radiation source for emitting optical emission radiation,
a detector for receiving optical reception radiation, and
a printed circuit board, which are arranged in a rigid spatial relation to one another, and
an optics carrier having
emission optics and
reception optics,
an emission direction being defined by the radiation source and the emission optics, and a reception direction being defined by the detector and the reception optics, and the emission optics and the reception optics having different focal lengths,
the adjustment method comprising:
establishing a desired orientation of the emission direction relative to the reception direction; and
displacing the entire module relative to the optics carrier, the displacement causing displacement-induced direction angle changes of the emission direction and the reception direction by a lever action of the different focal lengths of respectively different size, so that the orientation of the emission direction relative to the reception direction is varied.

2. The adjustment method as claimed in claim 1, wherein a first angular orientation of the emission direction with respect to the reception direction is adjusted by the displacement in a first lateral direction.

3. The adjustment method as claimed in claim 1, wherein a second angular orientation of the emission direction with respect to the reception direction is adjusted by the displacement in a second lateral direction.

4. The adjustment method as claimed in claim 3, wherein the first angular orientation and second angular orientation are orthogonal to one another.

5. The adjustment method as claimed in claim 1, wherein a second angular orientation of the emission direction with respect to the reception direction is adjusted by the displacement in a second lateral direction with the first and second lateral directions and the first and second angular orientations respectively being independent of one another.

6. The adjustment method as claimed in claim 3, wherein the reception direction is varied, and the emission direction remains unchanged, by the displacement in the second lateral direction.

7. The adjustment method as claimed in claim 1, wherein bearing on a common support surface of the optics carrier and the module defines the direction of the lateral displacement.

8. The adjustment method as claimed in claim 1, wherein the position of the emission optics relative to the reception optics orthogonally to their optical axis remains unchanged during the adjustment.

9. The adjustment method as claimed in claim 1, wherein the position of the emission optics relative to the reception optics orthogonally to their optical axis remains unchanged during the adjustment, with the emission optics and/or the reception optics being displaced axially at most only for correction of focusing.

10. The adjustment method as claimed in claim 1, wherein the position of the reception optics in the optics carrier is already definitively fixed before the adjustment.

11. The adjustment method as claimed in claim 1, wherein before the adjustment, the position of the emission optics in the optics carrier is precollimated into a prefocus setting, in which a divergence of the emission radiation emitted by the distance meter is greater than that of optimal collimation.

12. The adjustment method as claimed in claim 1, wherein before the adjustment, the position of the emission optics in the optics carrier is precollimated into a prefocus setting, in which a divergence of the emission radiation emitted by the distance meter is greater than that of optimal collimation, the focus setting being achievable from the prefocus setting by displacement of the emission optics in a tubular recess of the optics carrier.

13. The adjustment method as claimed in claim 11, wherein maintenance of the precollimated prefocus setting of the emission optics during the adjustment by joint displacement of the emission optics with the module in the focus direction of the emission optics.

14. The adjustment method as claimed in claim 1, wherein after the adjustment and fixing of the module relative to the optics carrier, collimation of the emission optics in the focus setting direction is carried out in order to adjust a desired divergence of the emission beam path.

15. The adjustment method as claimed in claim 1, wherein after the adjustment and fixing of the module relative to the optics carrier, collimation of the emission optics in the focus setting direction is carried out in order to adjust a desired divergence of the emission beam path by pressing the emission optics into a tubular recess of the optics carrier.

16. The adjustment method as claimed in claim 12, wherein before the precollimation, positioning of the module relative to the optics carrier is carried out in a position from which the module can be displaced only in the direction of decollimation of the emission optics or orthogonally thereto.

17. The adjustment method as claimed in claim 1, wherein the emission optics and/or the reception optics comprise a deviating mirror.

18. The adjustment method as claimed in claim 1, wherein the desired orientation of the emission direction relative to the reception direction is defined in that the emission direction and the reception direction at least approximately have a common point of intersection at a predetermined distance.

19. An optoelectronic distance meter comprising:
a printed circuit board, an optical radiation source and an optical detector, which are positioned and oriented immovably with respect to one another as a common module,
an optics carrier having emission optics and reception optics with a respectively different focal length, with the emission optics and the reception optics being displaceable with respect to one another only in the direction of their respective optical axes, and
an electronic evaluation unit with which a distance from the distance meter to a target object can be determined on the basis of a signal time of flight with the aid of a digitized reception signal of the detector,
wherein the optoelectronic distance meter is adjusted by
establishing a desired orientation of the emission direction relative to the reception direction; and
displacing the entire module relative to the optics carrier, the displacement causing displacement-induced direction angle changes of the emission direction and the reception direction by a lever action of the different focal lengths of respectively different size, so that the orientation of the emission direction relative to the reception direction is varied.

20. The optoelectronic distance meter as claimed in claim 19, wherein:
the radiation source emits parallel to a surface of the printed circuit board in the direction of the emission optics,
the detector has a photosensitive region lying parallel to the printed circuit board,
and light from the reception optics is directed by means of a deviating mirror onto the detector, and
the module is displaceable relative to the optics carrier in a first direction and a second direction, and bears on a mechanical stop in a third direction, with the emission optics being pressable into a tubular recess of the optics carrier, axially with respect to the optical axis of the emission optics, in order to collimate radiation emitted by the optical radiation source.

\* \* \* \* \*